(No Model.) 2 Sheets—Sheet 1.

J. McBRIDE.
CHUTE WAGON OR CART.

No. 541,378. Patented June 18, 1895.

WITNESSES:
C. R. Morgan
Lacey L. Cadwallader

INVENTOR
John McBride
by J. Lloyd Wiegang
atty (No Model.) 2 Sheets—Sheet 2.
J. McBRIDE.
CHUTE WAGON OR CART.
No. 541,378. Patented June 18, 1895.
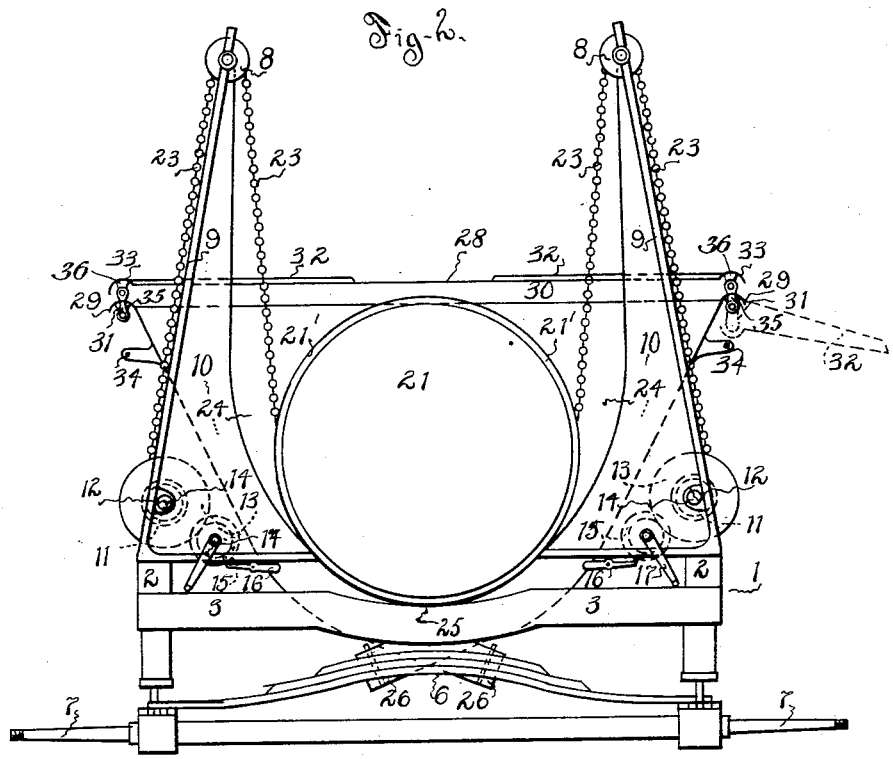
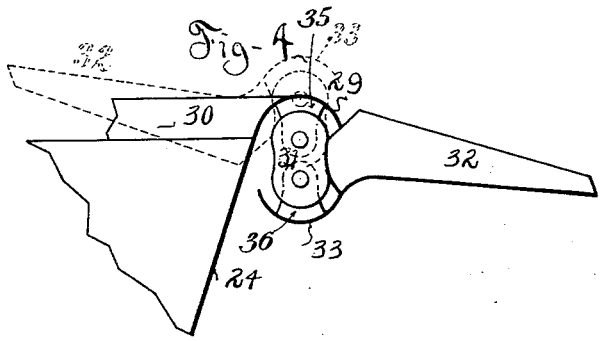
WITNESSES:
INVENTOR
John McBride

UNITED STATES PATENT OFFICE.

JOHN McBRIDE, OF PHILADELPHIA, PENNSYLVANIA.

CHUTE WAGON OR CART.

SPECIFICATION forming part of Letters Patent No. 541,378, dated June 18, 1895.

Application filed September 1, 1894. Serial No. 521,978. (No model.)

*To all whom it may concern:*

Be it known that I, JOHN MCBRIDE, a citizen of the United States, residing at Philadelphia, in the county of Philadelphia and State of Pennsylvania, have invented certain new and useful Improvements in Chute Wagons and Carts for the Delivery of Coal and Like Commodities; and I do hereby declare the following to be a sufficiently full, clear, and exact description thereof as to enable others skilled in the art to make and use the said invention.

This invention relates to chute wagons and carts for the delivery of coal and like material, and has for its object the easier handling of such commodities with less annoyance from dust; better facility of discharging through the inclined chute by reason of superior facilities for elevating and emptying the wagon into the chute a more easily fitted, and more substantial apparatus for hoisting the loaded wagon body, and for tilting it at any required angle for loading and discharging and from the construction of the entire apparatus a better durability in use.

This invention is in several respects supplementary to the invention set forth in my application for Letters Patent, filed February 9, 1894, and Serially numbered 499,692.

This invention consists of a peculiarly shaped wagon body converging toward the point of discharge from the bottom of the wagon and also to converge to the top from which the discharge may be made by tilting it and in the form of the hoisting gear which is so combined with the frame of the wagon as to greatly strengthen such frame and affords facilities for raising either side of the wagon at will and thus facilitating the filling of the cart or wagon when it is required to be filled by hand as well as facilitating the discharge thereof.

The construction and operation of this invention are shown in the accompanying drawings, in which—

Figure 1:
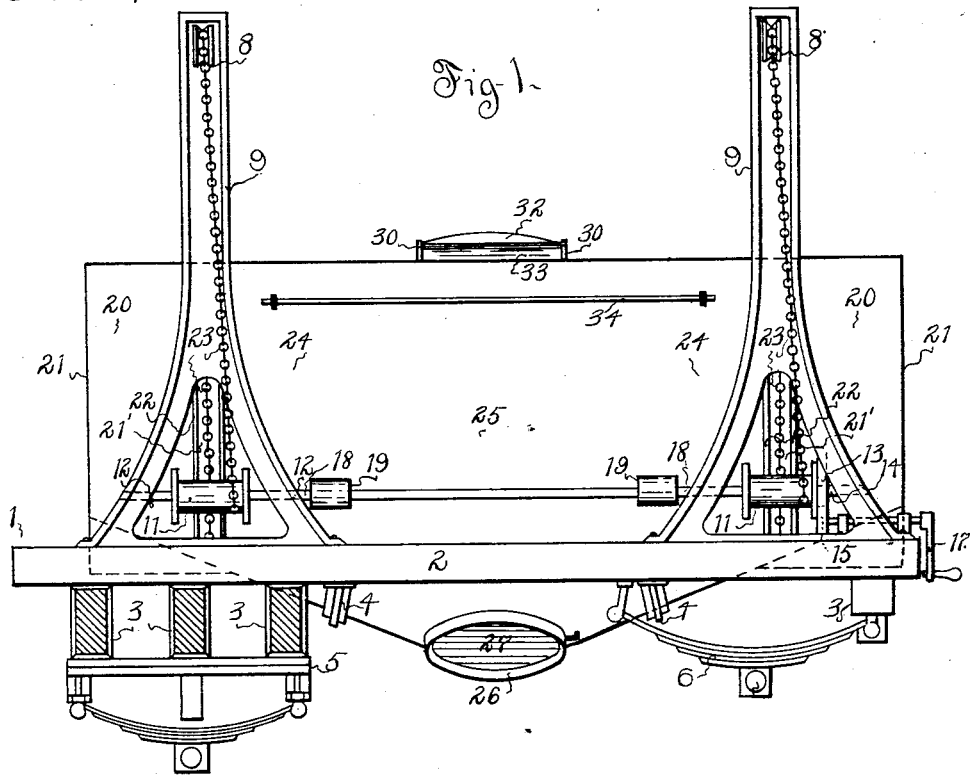
Figure 3:
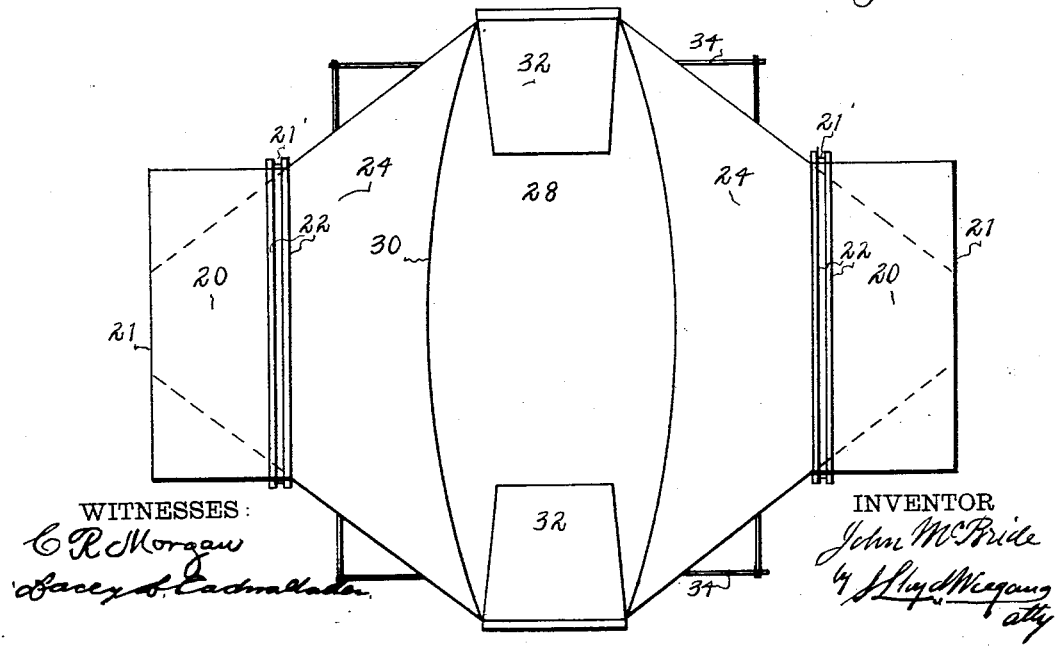

Figure 1 represents a side elevation. The wheels and driver's seat in the construction are omitted as not being in any manner involved in the invention. Fig. 2 is a rear end view. Fig. 3 is a plan view of the wagon-body. Fig. 4 shows a detail in the construction of delivering-funnels for delivering from the top of the wagon-body.

1 is the frame of the wagon; consisting of side pieces 2 transverse rails 3 and girts 4 formed of metal to conform to the shape of the lower part of the wagon body and afford a suspending support for the same while in transit.

5 is the fifth wheel by which the springs, king-bolt and front axle are attached to the wagon frame.

6 are the rear springs; 7, the rear axle.

Upon the frame 1 near each end, are placed on each side an upright hoisting frame 9 formed as a frame in shape like an inverted V or the capital letter A with a lateral brace 10 extending onto the front and rear girts of the wagon frame. In the upper part of each of these A shaped frames is placed a sheave 8 over which passes a chain 23 one end of which passes around and is secured to the barrel of a windlass 11, having journal supports 12 in the lower part of the frame 9, and operated by a pinion 13, upon the shaft 14, also journaled in said frame and controlled by a ratchet 15 and pawl 16 and arranged to be turned by a connected crank 17. The barrels of the forward windlasses are connected with the rear ones by an extension of the shaft 18 from the rear one and a jointed coupling shaft 19 intervening so that they turn freely irrespective of any springing or twisting of the frame of the wagon.

The body of the wagon 20 is formed with circular ends 21 having channel iron rings 21' with flanges 22 turned outwardly, between which flanges 22 the chains 23 wrap and are secured so that by winding the chains 23 from either side and unwinding those of the other the body of the wagon 20 can be turned to either side and by winding equally the chains on both sides the wagon body may be lifted without tilting.

The ends 21 of the wagon body 20 are cylindric for a short distance up to the place where channel iron rings 21 are secured to it. Between these and the center 25 of the wagon, the sides 24 are of an irregular conical shape so that the wagon body is widest at the center and any material therein such as coal will slide to the center of the wagon body 20, whether it stands in an upright position or be turned to either side. At the bottom of the wagon body near the center are placed two spouts 26 of such form as to fit the first section of an extensible chute which may be of any of the known forms.

A gate or slide door 27 in each spout 26 serves to close either or both.

At the upper or central part of the wagon body which is otherwise inclosed there is a large opening 28 through which the coal may be introduced in loading, which opening 28 narrows toward the sides of the wagon body, and has a lip 29 turned outwardly and downwardly thereon, and the lip near to the opening of the wagon body in the top of the wagon body is protected on each side by a flange or raised portion 30 so as to avoid spilling the coal upon the top of the wagon when it is tilted to discharge it.

To lugs 35 under each lip 29 and pivotally attached to a concentric pivot thereon, there is at each side a short link 31 to the opposite end of which link lugs 36 formed on a short section of a chute or funnel 32 are pivotally secured said chute having an upturned lip 33 which chute when in normal position may lie over the top of the wagon upon the coal, and it may be turned downwardly and the lip 33 of the chute placed beneath the lip 29 on the wagon body, so that no coal can pass between the chute 32 and the wagon body 20.

Below the short section of chute 32 on the wagon body 20 is secured a rail 34 to which a discharging chute may be suspended and on which it may be hung when the wagon is in transit in a manner similar to that described in the application for Letters Patent above referred to.

In using this invention by winding the windlasses the wagon body may be raised on either side or by winding both raised to any desired height and may be rotated so that in the event of its being desired to discharge the coal quickly contiguous to the side of the wagon it can be done without the intervention of any chute and without obstructing the roadway with the coal and when it is desired to fill the wagon by hand the wagon may be allowed to remain low and turned over so as to present the opening conveniently to receive the coal and as it is filled it may be turned upwardly toward its normal position.

When it is desired to empty the coal from the lower portion of the wagon chutes are applied to the nozzles or short tubes and the gate of such chute opened and the coal passes down by gravitation and in the event of the coal not moving freely which will sometimes occur when it is damp or it is disposed to adhere, by raising or tilting the wagon body to one side or the other it may all be detached from the body and discharged without the necessity of entering the wagon.

The inclosing of the top of the wagon prevents air currents from spreading the dust that is incident to the agitation of the coal during its discharge.

Having described my invention, what I claim therein is—

1. In a coal chute delivery wagon, the combination of a frame having sustaining girts adapted to receive the wagon body; a wagon body of the configuration described and shown in combination with a series of hoisting machines secured to said frame so as to brace the same substantially as set forth and described.

2. In a coal chute delivery wagon a hoisting machine having the bearings for the winding shaft, the pinion shaft, pawl and sheave and the lateral brace all formed integrally with the frame thereof, in combination with the pinion shaft, pinion, spur wheel, winding drum and shaft, pawl, and sheave for hoisting arranged to brace the wagon frame, and to operate as set forth.

3. In a coal chute delivery wagon, a wagon body having a lip 29 of the form described and shown in combination with a chute section, links having a pivoted connection concentric with said lip 29, and a second pivoted connection concentric with a lip 33 upon said chute section substantially as shown and described.

4. In a coal delivery chute wagon a wagon body of the configuration described and shown in combination with an encircling channel iron rings adapted to receive chains winding and unwinding thereon and hoisting mechanisms for the purpose of elevating and turning the wagon body as set forth and described.

5. In a chute wagon the series of A shaped bracing frames each having a winding drum supported therein in combination with flexible coupling shaft, flexibly connecting the front and rear hoisting drums as set forth and described.

JOHN McBRIDE.

Witnesses:
C. R. MORGAN,
S. H. HAAS.